*FIG_3*

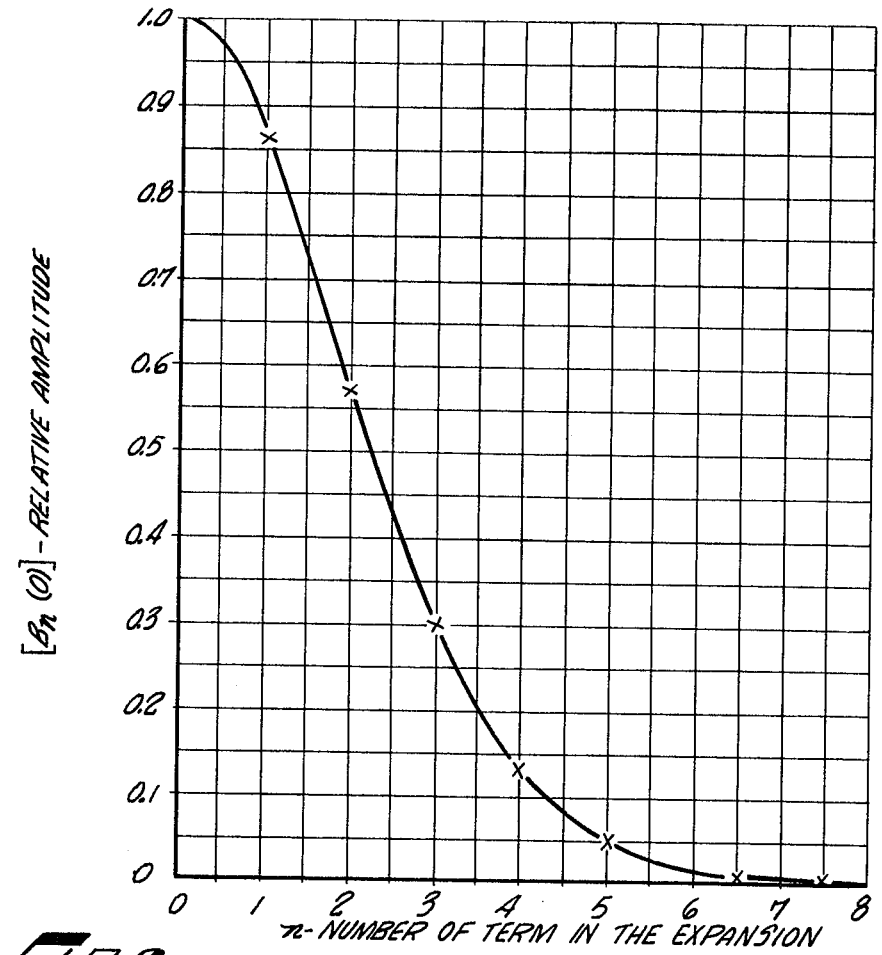
_FIG. 2._
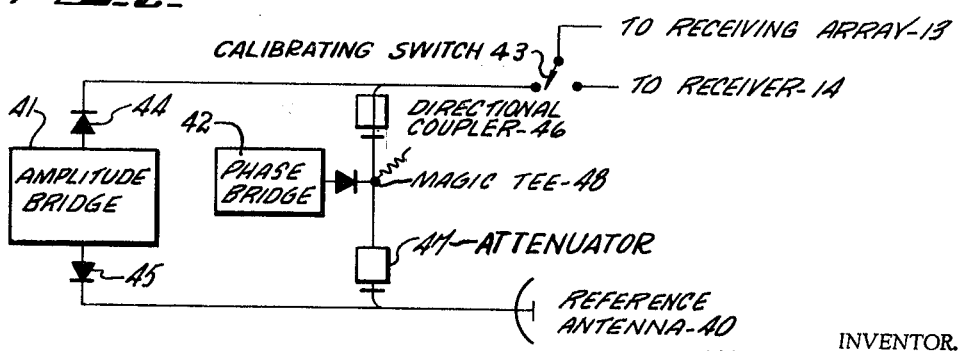
_FIG. 7._

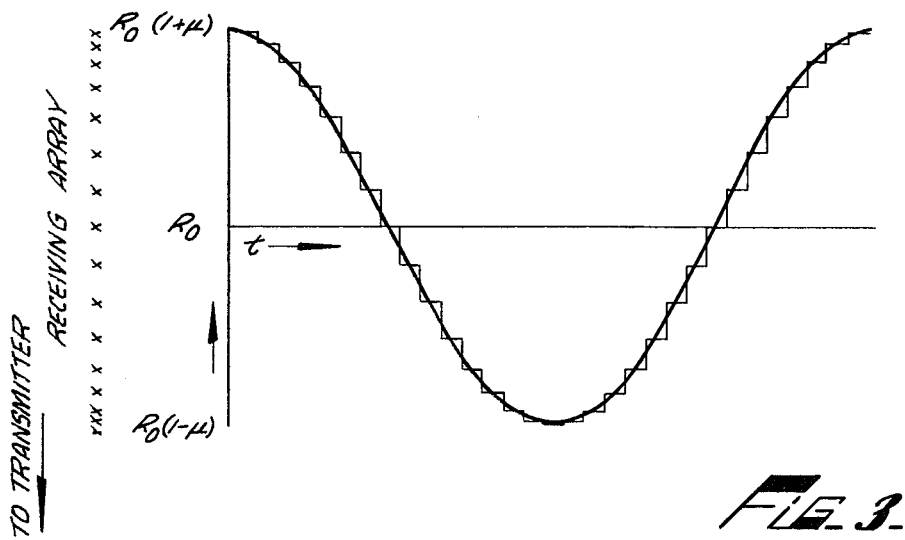

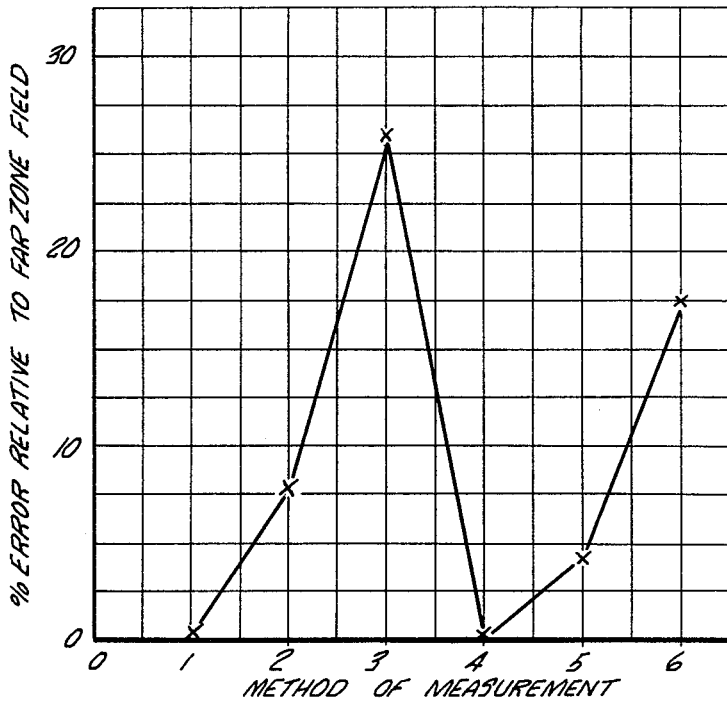

METHOD:
1- MEASUREMENT DISTANCE= $2D^2/\lambda$, UNMODULATED -CONVENTIONAL
2- MEASUREMENT DISTANCE= $D^2/\lambda$, UNMODULATED -CONVENTIONAL
3- MEASUREMENT DISTANCE= $.3D^2/\lambda$, MODULATED WITH $N=2$
4- MEASUREMENT DISTANCE= $.3D^2/\lambda$, MODULATED WITH $N=3$
5- MEASUREMENT DISTANCE= $.3D^2/\lambda$, MODULATETED WITH $N=4$
6- MEASUREMENT DISTANCE= $.3D^2/\lambda$, UNMODULATED -CONVENTIONAL

*FIG_4*

INVENTOR.
HOWARD E. SHANKS
ROBERT W. BICKMORE
BY Christie, Parker & Hale
ATTORNEYS.

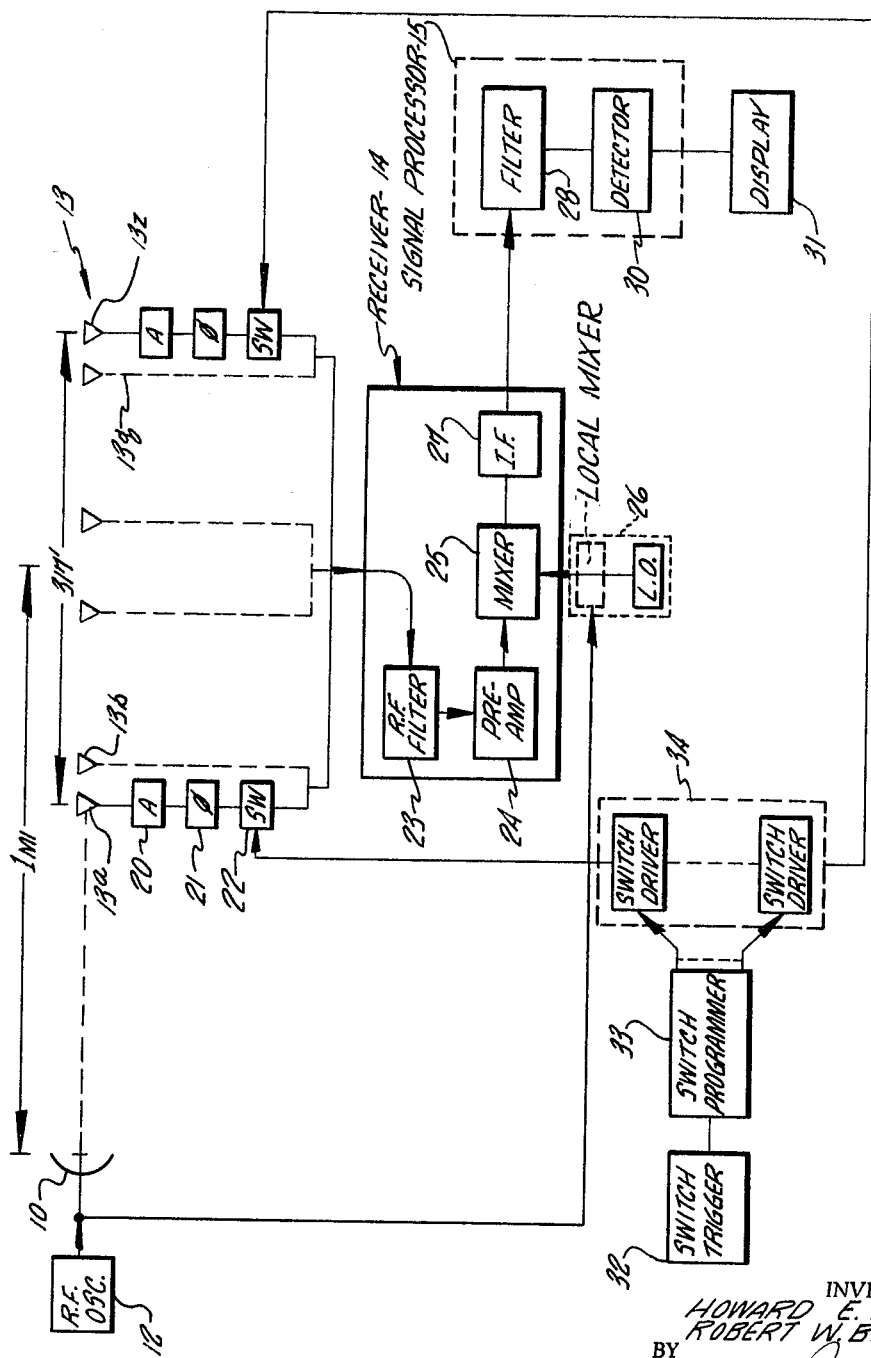

United States Patent Office

3,166,748
Patented Jan. 19, 1965

3,166,748
METHODS AND APPARATUS FOR MEASURING ANTENNA RADIATION PATTERNS
Howard E. Shanks, San Marino, and Robert W. Bickmore, Santa Monica, Calif., assignors, by mesne assignments, to Teledyne Systems Corporation, Hawthorne, Calif., a corporation of California
Filed July 17, 1961, Ser. No. 124,609
20 Claims. (Cl. 343—100)

This invention relates to methods and apparatus for measuring the Fraunhofer diffraction pattern or far zone characteristics of an antenna outside the far zone.

Antennas have become larger and larger whereby their far field distances may vary typically from several miles to tens of miles, thereby rendering the accurate determination of the far field characteristics of these large antennas, in particular, very difficult. Such large antennas are presently being used for satellite tracking purposes and the like. In the past, relatively small antennas have been employed and the radiation patterns have been simply determined by measuring the pattern at the desired receiving point or points, either in the near zone, far zone, or within the Fresnel zone. However, with the advent of the larger antennas and, therefore, the larger antenna ranges, the distance between a transmitting and receiving antenna may include various obstructions and/or cavities which cause the conventional techniques to be either unusable or very difficult to practice. The need for accurately determining the far field radiation or the Fraunhofer diffraction pattern, in particular of large antennas, is even a greater necessity than heretofore.

In general, for most measurements, it has been found sufficiently accurate to measure the far field or Fraunhofer diffraction pattern at distances denoted as $$\left(\frac{2D^2}{\lambda}\right)$$

wherein D is the diameter of the antenna and λ is the wave length of the radiated energy.

The attempts to discover means of measuring the Fraunhofer diffraction patterns of very large antennas have included an approximation technique which involves moving the feed element of a parabolic antenna off center to effect a small reduction in the required range but, also, has been found to introduce errors, primarily due to spherical aberration, which prevent more than a token reduction in range. It has also been proposed to focus the antenna by merely rotating the antenna on its pedestal, however, only a limited class of antennas can be mechanically focused since this requires a physical molding of the aperture surfaces into the segment of a sphere. Other known methods require measuring the amplitude and phase of the radiated field over a closed surface surrounding all sources. If the closed surface is much larger than the antenna, i.e., Fresnel region, a computer can be designed which performs a Fresnel-Fraunhofer transformation to obtain the Fraunhofer pattern. The difficulties of probing the aperture field and measuring phase over tremendous path lengths, however, are well known and make this method impractical. Accordingly, a measuring method for determining the far field or Fraunhofer diffraction pattern is desired that eliminates the need for a direct phase measurement and which does not require modification of the antenna from its normal operation configuration. The measuring method should, in addition, be equally applicable to fixed as well as rotatable antennas and the geometrical distances involved should not be overly critical.

The present invention provides improved methods and apparatus for measuring the Fraunhofer diffraction pattern outside the far zone without requiring modification of the antenna and without the necessity of either probing the field at very great distances or measuring both amplitude and phase at small distances or a computer-type operation on a near zone measured value to obtain the far zone value. The present invention, therefore, advantageously provides a practical and expedient method and apparatus of measuring directly the Fraunhofer diffraction pattern of any antenna, particularly very large antennas.

In general, the method of the invention includes the measuring of the Fraunhofer pattern of an antenna, preferably in the Fresnel zone, by radiating electromagnetic energy from a source and receiving the radiated energy at a preselected range or distance outside of the Fraunhofer zone in a periodic time-modulated fashion and then electronically processing the thus modulated signal to directly derive the Fraunhofer pattern of the antenna. The processing of the time modulated signal may include the voltage multiplication or simulated multiplication of this signal to cause the received radiated signal to assume a plurality of unique information portions, including one characteristic of the Fraunhofer pattern and then separating out only that signal portion characteristic of the desired pattern.

The apparatus for providing this direct measurement of the Fraunhofer pattern in a near zone may include a plurality of receiving antennas or probes spaced apart in a predetermined fashion and controlled for preselected intervals to cause the radiation coupled to a receiver to assume a time-modulated characteristic. In one particular embodiment of the invention, the receiving antennas are spaced in accordance with the trigonometric cosine function and the antennas are coupled to the receiver for substantially equal time increments and are switched on and off in a sequential fashion to cause the radiated energy delivered to the receiver to have the desired time modulated characteristic. In order to separate the plurality of unique information portions which comprise this time modulated signal, a voltage multiplication technique is required. In the preferred embodiment, each receiving antenna includes an attenuator and a phase shifter in series therewith to cause the signals from these antennas to assume a controlled amplitude characteristic similar to that performed by a conventional voltage multiplication arrangement. When the signal having this separable characteristic is applied to a receiver the signal may then be further processed by means of mixing it with a local oscillator signal and applying it to a filter tuned merely to the voltage portion characteristic of the Fraunhofer pattern. Upon separating out the desired voltage portion, it may be applied to a detector and a conventional display device such as a pattern recorder to directly derive and display the amplitude characteristic of the far zone pattern.

These and other features of the present invention may be more fully appreciated when considered in the light of the following specification and drawings, in which:

FIGURE 2 is a graphical illustration of the relative amplitudes of the successive terms of the Axial Fresnel Field Expansion;

FIGURE 3 is a graphical illustration of an arrangement of a receiving array showing the modulation of the range with time;

FIGURE 4 is a graph illustration of the relative accuracies of prior art unmodulated measurement methods and the modulated measurement method of the present invention under different conditions;

FIGURE 5 is a block diagram of an embodiment of the invention of FIG. 1;

FIGURE 6 is a detailed schematic diagram of a particular arrangement of the invention of FIG. 5;

FIGURE 7 is a schematic diagram of calibrating arrangement for the embodiment of FIG. 5;

FIGURE 8 is a block diagram of an embodiment of the invention of FIG. 1 based on a Doppler arrangement employing a non-vibrating receiving probe; and FIGURE 9 is a block diagram of an embodiment of the invention of FIG. 1 based on a Doppler arrangement employing a vibrating probe.

Figure 1:
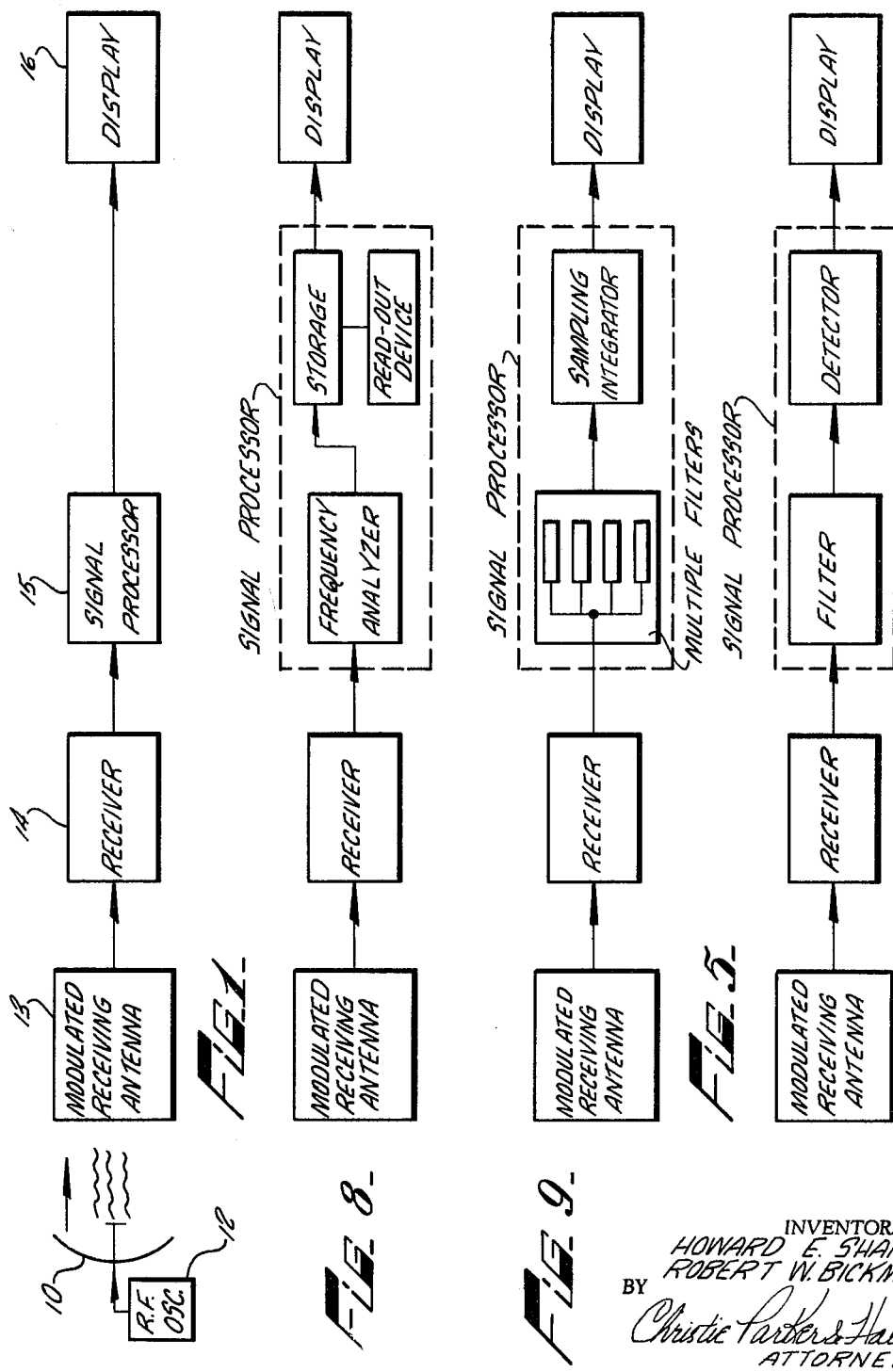
FIGURE 1 is a block diagram of the general system embodying the invention.

Prior to discussing the structural organization for implementing the present invention, it is helpful to review, in general, the mathematical analysis forming a basis for the concept involved in the system for carrying out the invention.

It has been shown by Sommerfeld that the electric, E, and magnetic, H, fields of a bounded monochromatic source of electromagnetic radiation may be represented by an expansion of the general form:

$$U(R,\theta,\phi) = \frac{e^{-jkR}}{R} \sum_{n=0}^{\infty} \frac{A_n(\theta,\phi)}{R^n} e^{j\omega t} \quad (1)$$

in the region for which $|R|>c$, where $c$ is the radius of a sphere which just bounds the source and R, $\theta$, $\phi$ are the usual spherical coordinates, and R is the range or distance between the transmitting and receiving antennae. In particular, at a point $P(R,\theta,\phi)$ external to the bounding sphere, the voltage may be expressed as:

$$E_P(R,\theta,\phi) = \frac{e^{-jkR}}{R} \sum_{n=0}^{\infty} \frac{B_n(\theta,\phi)}{R^n} e^{j\omega t} \quad (2)$$

where it may be shown that the $n=0$ term is the Fraunhofer field or far zone and the remaining terms comprise the Fresnel zone or "near field."

If the above equations are applied to a bounded source, such as an antenna, mounted on a rotating pedestal and a pickup probe is located in the near zone of the antenna and the distance of the probe from the center of rotation is periodically variable with time. Under these conditions, the distance, or range R, may be expressed as $$R = R_0[1+\mu F(t)] \quad (3)$$

where $R_0$ is the mean value of R, a constant, $\mu$ is the modulation coefficient, and $F(t)$ is the time-periodic function. Under these conditions the voltage at the probe terminal is $$V = V_0 e^{-jkR_0[1+\mu F(t)]} e^{j\omega t} \sum_{n=0}^{\infty} \frac{B_n(\theta,\phi)}{R_0^{n+1}} [1+\mu F(t)]^{-(n+1)} \quad (4)$$

where the series may be terminated at a value of $n=N$ if an allowable error is prescribed. If the phase term $$e^{-jkR_0[1+\mu F(t)]}$$

is eliminated and the frequency converted from R-F to I-F, to ease the processing of the received signal, Equation 4 has the form $$V_{i-f} \cong V_0 \sum_{n=0}^{\infty} \frac{B_n(\theta,\phi)}{R_0^{n+1}} [1+\mu F(t)]^{-(n+1)} \cos \omega_{i-f} t \quad (5)$$

Since $F(t)$ is periodic, it may be represented by a Fourier series, $$F(t) = \sum_{m=0}^{M} f_m \cos m\Omega t; \quad \Omega \ll \omega_{i-f} \quad (6)$$

This indicates that each term including the term representative of the Fraunhofer field of the above Sommerfeld expansion has a unique variation with range change and therefore may be considered a periodic time modulation of the received radiation. These terms, then, can be considered as a plurality of unique information channels or signal portions and with proper signal processing or detection the signal portion including the Fraunhofer field may be separated and displaced to give a direct reading of the Fraunhofer pattern.

In order to process the time modulated signal to derive the far zone information, however, the signal must be further modified to allow the far zone term to be readily separable. This further processing may be accomplished by controlling the amplitude of each term in the above Expression 6 and which amplitude control may be accomplished by a voltage multiplication technique. The time modulated signal is multiplied by a voltage that is synchronous or time related to the voltage represented by Equation 5 but not necessarily of the same amplitude. This voltage is expressed by Expression 7 as follows:

$$V_m = [1+\mu F(t)]^{N+1} \quad (7)$$

and then substituting the Fourier series form for $F(t)$. The resulting voltage is $$V_{i-f} V_m \cong V_0 \sum_{n=0}^{N} \frac{B_n(\theta,\phi)}{R_0^{n+1}} \left[1+\mu \sum_{M=0}^{M} f_m \cos m\Omega t\right]^{N-n} \cos \omega_{i-f} t \quad (8)$$

The highest harmonic in this equation (neglecting the I-F dependence) cosine $(MN\Omega t)$, has associated with it the coefficient $B_0(\theta,\phi)$, the Fraunhofer field, the desired signal portion to be separated.

With the above analysis in mind, it will be noted that one of the elementary parameters which must be established for the method of this invention for any given physical situation is the value of N, the number of terms which must be used in the above expressions to obtain reasonable accuracy. N is, in general, a function primarily of the type of aperture distribution and the radial coordinate R. The determination of the number of terms may best be found by considering a particular physical arrangement, such as the antenna presently located at the Goldstone Tracking Facility of the Jet Propulsion Laboratory, Pasadena, California. This antenna is a paraboloid of revolution with a diameter of 85 feet. The antenna has an approximate taper of $(1-\rho_0^2)$ ($-24.6$ db sidelobe level). The frequency radiated from this antenna will be considered to be 2400 megacycles and the approximate range is one mile. It can be shown that a series in powers of $$\frac{1}{R}$$

corresponding to the multiple Sommerfeld expansion of Equation 1 may be expressed as follows:

$$U_P(\theta=0)_{\text{Fresnel}} = \frac{jk}{2\pi} \frac{e^{-jkR}}{R} \int_0^{2\pi} \int_0^a F(\rho,\psi) \left\{\sum_{n=0}^{\infty} \frac{(-1)^n}{n!} \left(\frac{jk\rho^2}{2R}\right)^n\right\} \rho d\rho d\psi \quad (9)$$

This expression can be evaluated for the frequency of 2400 megacycles and $a=42.5$ feet for the physical situation we have assumed and it becomes as follows:

$$U_P(\theta=0)_{\text{Fresnel}} = j1.31062 \frac{e^{-jkR}}{R} \left\{1 - j\frac{.87374}{R} - \frac{.57257}{R^2} + j\frac{.30016}{R^3} + \frac{.13113}{R^4} - j\frac{.04910}{R^5} - \frac{.01609}{R^6} + j\frac{.00469}{R^7} + \frac{.00123}{R^8} \cdots \right\} \quad (10)$$

for R in miles.

FIGURE 2 shows graphically the relative amplitudes of the successive terms in the above series for a range of one mile. It will be seen that the series converges quite rapidly at this range; the amplitude of $n=8$ term is approximately 0.1 percent of that for the $n=0$ term, or the Fraunhofer term (0.1 percent in field, 0.01 percent in power). The above expression can, therefore, be used to determine the value N in Equation 5 for a prescribed allowable error.

The method of measuring the Fraunhofer pattern outside of the Fraunhofer zone is based upon the general theory of a periodic time variation of the range of the total field being measured. This general theory is discussed in an article by H. E. Shanks and R. W. Bickmore appearing in the Canadian Journal of Physics, volume 37, 1959, on pages 263–275 and is entitled "Four-Dimensional Electromagnetic Radiators." As is pointed out in this article, the time domain is utilized as an additional variable with which to control the antenna radiation characteristic. The radiation characteristic is controlled by periodically time modulating one or more of the antenna parameters to cause the radiation pattern to have a characteristic which is periodically changing as a function of time to provide a number of independent information channels corresponding to the harmonic frequency components of the modulated patterns. This, then, is effectively a time modulation of the measurement distance and which range has been expressed hereinabove in Equation 3.

The time modulated characteristic can be accomplished by physical movement of the probe antenna over the measurement range. This is not a very practical method for all applications and a very good approximation to the continuous motion of the probe may be obtained by sequentially switching along a series of probe antennas distributed over the range interval. Assuming equal switching time increments for each receiving antenna or probe, it can be shown that the choice of a cosine trigonometric distribution of the probe antennas over the range interval results in the best suppression of the harmonics appearing in the $F(t)$. This condition is illustrated in FIG. 3, wherein the probe spacings are unequal and approximate the fundamental cosinusoidal range variation and which cosinusoidal range variation may be obtained with a relatively few elements. In one example, only 17 elements were required. It should be noted that a period of the range variation requires traversing the physical array of receiving antennas or probe elements twice, once in each direction, to obtain the periodic variation or cosinusoidal approximation. In addition, the physical array may contain either an odd or an even number of elements. In the above approach, an even number of elements was always considered.

A further analysis is required to determine the signal level of the terms of the above expression and, in particular, the relative amplitude of the signal corresponding to the Fraunhofer field. For this purpose the Fraunhofer field may be expressed as $R(t)$ as follows:

$$R(t) = R_o(1 + \mu \cos \Omega t) \quad (11)$$

If this expression is substituted in Equation 8 shown above, an axial signal level may be obtained and the expression of the summation of the expressions of $[1 + \mu \cos \Omega t]^{N-n}$ is:

$$V_F = V_o \frac{\mu N}{2^{N-1}} \left[ \frac{B_o(0)}{R_o} + \sum_{n=N+1}^{\infty} \frac{(-1)^N (n-1)!}{(n-N-1)! N!} \frac{B_n(0)}{R_o^n} \right] \cos N\Omega t \quad (12)$$

for $n > N$ and, therefore, represents the error contribution for a given value of N. This expression, therefore, forms the criteria for the final determination of the value of N for a prescribed allowable error in the measurement of the Fraunhofer field. It should be noted that a distinct advantage in accuracy over the expression in Equation 5 is obtained since $B_n$ for $n$ between 1 and $N+1$ do not appear. The measurement accuracy which could be obtained for N equal to 2, 3, and 4 for a range of one mile $$\left( \simeq \frac{.3D^2}{\lambda} \right)$$

is compared with the accuracy of prior art methods in FIG. 4 at measurement distances of $$\frac{2D^2}{\lambda}, \frac{D^2}{\lambda}, \text{ and } \frac{.3D^2}{\lambda}$$

It will be seen from an examination of FIG. 4 that with $N=3$ an accuracy at broadside is achieved which is better than the field measured at $$\frac{2D^2}{\lambda}$$

or at the conventional measuring distance. It has also been noted that the value of the field which is measured in the customary manner at a range of $$\frac{.3D^2}{\lambda}$$

is in error by approximately 17 percent. It can now be concluded, therefore, that Equation 12 also forms the basis for the determination of the level of the voltage which is proportional to the far field term $B_o(0)$.

Another factor that must be determined is the required receiver sensitivity as the function of the modulation coefficient. It has been found that it is desirable to choose N as small as is consistent with reasonable accuracy and that the required receiver sensitivity must increase as the number of terms becomes greater and as the range decreases. Therefore, although the concept of this invention is applicable to measurements in both the near zone and the Fresnel zone, it is best applied in the Fresnel region.

Now with the above analysis in mind, the general system for measuring the Fraunhofer pattern will be discussed, that is, a relatively large antenna will be assumed as the transmitting antenna and the measurements will be taken at a distance which is a fraction of the usual far field distance for the antenna. The system employs a method of processing the signal from a receiving antenna whose distance from the transmitting antenna is varied periodically with time in such a fashion that the far field term in the above Sommerfeld multiple expansion of the field can be separated from the near field terms. This processing or separation involves the multiplication or simulated multiplication of the received signal by a voltage which is related to the time variation of the range and filtering out the resulting signal to obtain the harmonic which has the far field dependence of the transmitting antenna as a coefficient.

The general system is shown in FIG. 1 wherein the transmitting antenna 10 is shown coupled to a radio frequency oscillator 12. The antenna 10 is shown radiating energy unidirectionally towards a modulated receiving antenna represented by the block 13. The modulated receiving antenna is coupled to a receiver 14 which may be a narrow bandwidth receiver having low noise and good stability such as the receiver commercially available from the Collins Radio Company, identified by the Model No. 51J4. The signal detected by the receiver 14 is then applied to a signal processing arrangement 15 which, in turn, delivers the signal to the display element 16. The Fraunhofer pattern is derived directly from the display element 16.

The modulated receiving antenna 13 in this particular embodiment will be considered to comprise a plurality of receiving antennas identified by the reference characters $13^a$, $13^b$ ... $13^y$, and $13^z$ (FIG. 6) and spaced apart at preselected intervals to obtain the cosine trigonometric variation of the range as shown in FIG. 3. Each antenna is provided with an individual amplitude control means comprising an attenuator 20 and a phase shifter 21 arranged in a serial fashion with a switching circuit 22, as shown in FIG. 6 for the antenna $13^a$. The switching circuit 22 may comprise a wave guide crystal switch capable of high speed operation. The amplitude control means and the switching circuit 22 are typically shown for the receiving antenna $13^a$ and $13^z$, the two antennas that are at opposite ends of the antenna array. The receiving antenna 13 is a corporate fed series of elements arranged to obtain the desired trigonometric relationship along a line extending from the center of rotation of the transmitting antenna 10. The distance from the center of rotation to the center array is approximately one mile in accordance with the above assumptions. Under these operating conditions the length of the array is the direct function of the range modulation coefficient $\mu$, assumed to be 0.03 and, therefore, the array length is approximately 317 feet. As indicated hereinabove, the number of elements in the array depends on the accuracy desired in the approximation to the cosinusoidal range modulation. As few as six elements are required for reasonable frequency stability and filter bandwidths. Short, broad-wall, shunt slot linear arrays of the order of five wave lengths in length oriented transversely to the receiving antenna length with the broad walls of the short arrays in a horizontal plane will provide the necessary signal level for the harmonic associated with the far field pattern. The spacing of the closest short arrays, is, therefore, many wave lengths and the mutual coupling of the elements will be very small. A dipole antenna may also be utilized, however, it produces a signal level particularly for the far field pattern that is low and it is desirable to use probes that provide more gain.

The receiver 14 may include a radio frequency filter 23 coupled to receive the energy from the modulated receiving antenna 13. The radio frequency filter 23 is, in turn, coupled to a low noise, radio frequency preamplifier 24 which delivers an amplified version of the signal to a frequency converter or mixer 25. The mixer 25 is of conventional construction and operates on the amplified signal from the radio frequency preamplifier 24, as well as the oscillator signal delivered by the local oscillator 26 to produce a signal of intermediate frequency which is applied to the intermediate frequency stages 27. The intermediate frequency from the stages 27 are then coupled to the signal processor 15.

It is thought that the radio frequency filter 23 is required to reduce the amplitude of the fundamental R.F. frequency so that the distortion of the harmonic at the frequency $\omega + N\Omega$ does not occur during the preamplification and mixing operations. It is also thought that this can be accomplished by using a preamplifier for the element 24 which limits the gain of the fundamental R.F. frequency. Since the signals associated with the far field term of the received radiation is at a very low level, the low noise preamplifier 24 is thought to be necessary. It should have a bandwidth of 30 kilocycles, a noise figure lower than three decibels, and a gain of 30 decibels as well as being very gain stable.

As is well known, the frequency converter or mixer 25 is to translate the modulation spectrum to an intermediate frequency spectrum to allow the far field term to be more readily detected or separated. This detection or separation is accomplished in accordance with the present invention by processing the signal by narrow band filtering. As in any frequency converter, the local oscillator is of great importance and, in this particular instance, the stability of the local oscillator 26 must be of approximately 2 parts in 1,000,000. Therefore, if an intermediate frequency of 30 megacycles is assumed for the receiver 14, the local oscillator frequency must be 2,430 megacycles and must, therefore, have a stability of $\pm 2.5$ kilocycles. It is possible to relax the stability requirements for the local oscillator 26 considerably by using a portion of the transmitter signal in combination with a very stable local oscillator signal to obtain the local oscillator frequency. When the local oscillator signal is mixed with the radio frequency signal by means of a local mixer to produce the intermediate frequency signal, the transmitter instability is essentially cancelled out and the stability of the intermediate frequency is that of the local oscillator. A further requirement on the mixer 25 is that it must be linear over a 40 decibel dynamic range at the power level of the far field harmonic. The intermediate frequency stages 27 can be of conventional design and should preferably be of relatively narrow bandwidth, on the order of 30 kilocycles, and have modulated gain and good stability.

The signal processor 15 is utilized to extract the harmonic exhibiting the far field dependence from the intermediate frequency spectrum and to detect and display this information. To this end, the signal processor 15 comprises a filter 28 coupled to the intermediate frequency stages 27 and delivering its output signal to a detector 30. The output signal from the detector 30 is then coupled to a conventional display element 31 which may be a pattern recorder.

In accordance with the above assumed physical arrangement, the filter 28 may be a crystal filter with a center frequency of 30 megacycles+30 kilocycles and a bandwidth narrow enough to reject the adjacent harmonics. To this end, a 60 decibel bandwidth of 10 kilocycles may be used. The detector 30 may be a square law detector. The display element 31 may be in the form of a commercially available pattern recorder such as that sold by the Scientific Atlanta Corporation.

The means for controlling the switches 22 comprises a switch trigger oscillator 32 which may produce square wave pulses at 10 kilocycles and is coupled to a switch programmer 33 having a plurality of output circuits each coupled to an individual switch driver 34 and which switch drivers are individually associated with one of the switching elements 22 for the probes in the modulated receiving antenna array 13. The switch programmer 33 accepts the triggering pulses from the switch trigger oscillator 32 and distributes them in a sequential fashion to each of the switch drivers 34 whereby the switches are each turned on for the same increment. The switch driver 34 may conveniently comprise the Beam X Magnetron switching tube sold by the Burroughs Corporation of Detroit, Michigan. It will be recognized that the beam switching tubes are responsive to a signal to switch between each of its plurality of stable states to provide a unique signal in accordance with the state to which the beam is sitting and can be triggered from position to position to follow either a clockwise or counter-clockwise rotation.

The cosinusoidal variation is achieved by switching first the antenna $13^a$ on and then the antenna $13^b$ and, in sequential fashion, to the antenna $13^z$, and then back through the same array in the reverse direction, that is, from the antenna $13^z$ to $13^y$, et cetera, to $13^b$ to $13^a$ to produce the desired periodic range modulation.

The characteristic of the transmitter 10 must also be considered if accurate pattern measurements are required. To this end, the power output of the transmitter 12 must be high enough to provide sufficient signal for detection over the desired dynamic range and the transmitter must be gain and frequency stable. The gain and frequency stability of the transmitter 12 should be comparable to that of the local oscillator 26. Excellent frequency coherence between the local oscillator 26 and the transmitter 12 may be obtained by using the transmitter signal for the derivation of the local oscillator signal.

When the transmitting antenna is rotated, it should be at a slow rate relative to the high speed switching rate for the antenna 13.

As was indicated hereinabove, in order to effect the separation of the far field harmonic from the remainder of the terms in the Sommerfeld expansion, it is necessary to multiply the intermediate frequency voltage by a voltage which is synchronous or time related with the form selected for the range modulation, raised to the power $N+1$. In the above described structural organization the voltage multiplication has been obtained by amplitude controlling the signal detected by each of the receiving probes $13^a$–$13^z$. In accordance with the present invention, this amplitude control, that is, the separate calibration of the amplitude and phase of each of the signals detected by the receiving array, is separately calibrated with respect to the other receiving probes in the array to produce the desired amplitude characteristic for the signal coupled to the receiver 14 to allow the far field harmonic to be separated by the filter 28. It can be shown mathematically that the amplitude control arrangement employing the attenuator 20 and the phase shifter 21 is equivalent to the conventional voltage multiplication or mixing technique. To implement the conventional direct voltage multiplication, the voltage multiplication signal may be controlled by the switch programmer 33 to provide a voltage of the same time modulation as that chosen for the range and apply this voltage to a mixer arranged intermediate the intermediate frequency stages 27 and the filter 28 to combine these signals and then apply them to the filter 28. This, too, would give each signal portion in the received radiation a unique amplitude characteristic to allow it to be "amplitude" filtered.

When the amplitude control arrangement of FIG. 6 is employed, the voltage multiplication is simulated by calibrating the attenuator 20 and phase shifter 21 to provide the received signal with desired amplitude characteristic. In addition, the calibration procedure provides a means for correcting the effect of the nonuniformity of the receiving elements of the associated feed and control circuitry. It is very important that the calibration technique for adjusting the attenuator 20 and phase shifter 21 be made as simple as possible. Briefly, the amplitude control may be achieved by means of the elements 20 and 21 upon calibration to provide in-phase signals with the proper variation in amplitude to produce the desired modulation pattern.

The organization shown in FIG. 7 shows an arrangement for calibrating the elements through the use of independently adjustable amplitude and phase bridges 41 and 42 respectively. The amplitude bridge 41 may comprise a conventional Weinschel Dual Insertion Loss Test Setup while a conventional R.F. phase bridge allows adjustment of the phase to within plus or minus one electrical degree.

As is shown in FIG. 7, the signal received from each element comprising the modulated receiving antenna array 13 is compared in turn with a signal from a fixed calibration antenna identified as the reference antenna 40. The reference antenna 40 is coupled in a parallel circuit relationship to the amplitude bridge 41 and the radio frequency phase bridge 42 at one end terminal thereof. The receiving array 13 is further arranged to be switched by means of a calibrating switch 43 from the receiver 14 proper to the calibrating arrangement and to couple the received signal to the remaining terminal of the amplitude bridge 41 and the phase bridge 42. The two input terminals of the amplitude bridge 41 are each provided with a separate diode 44 and 45 to eliminate the phase information from the signals coupled thereto to allow the amplitude of the voltages of the two signals under comparison to be controlled without effecting their phases. This allows the amplitude and phase of the signals to be independently adjusted, that is, without effecting the other and thereby eliminates the playing back and forth between the two bridges.

The signals are also coupled to the phase bridge 42 by means of a directional coupler 46 connected to the calibrating switch 43 and an attenuator 47 coupled to the reference antenna 40 and, in turn, by means of a magic Tee 48, to the phase bridge 42. Since the received radiation may not be changed, the amplitude of the signal provided by the reference antenna 40 is modified by means of the attenuator 47 to adjust for any differences in amplitude between the two signals prior to their application to the phase bridge 42. During the calibration, the signal transmitted to the receiving array 13 must be amplitude modulated at 1,000 cycles per second. Alternatively, a small antenna may be used as the transmiting antenna for calibration purposes to assure that the receiving array 13 and the reference antenna 40 will be in the far field of this small antenna and then the detected field will display the proper $$\frac{1}{R}$$

dependence with range.

The calibration procedure to follow includes setting the correct level of the signal from one of the particular probes $13^a$–$13^z$, as calculated by using the amplitude bridge 41. Then the phase of this same receiving probe is set by first adjusting the attenuator 47 for the phase bridge 42 and then adjusting the phase shifter 21 for the receiving probe to set the correct phase. The remaining probes are then adjusted in the same fashion and, upon completion of the calibration, the calibration switch 43 is switched back to the receiver 14 and the actual measurements can be taken.

With the above structural organization in mind, it should be evident that the Fraunhofer pattern may be directly displayed on the element 31 in the form of a strip chart or the like by turning on the switch trigger 32 whereby the receiving probes $13^a$–$13^z$ are sequentially coupled to the receiver 14 to produce the time modulation and the voltage multiplication or amplitude control due to the previous calibration of the attenuators 20 and phase shifter 21 to provide the thus modulated and modified signal to the receiver 14. The receiver 14 processes this signal and produces an intermediate frequency signal having the desired characteristic that is coupled to the filter 28. The far field term is then separated out or "amplitude" filtered by the filter 28 and the far field coefficient of the far field voltage is detected by the square law detector 30 and applied to the display element or pattern recorder 31 to display the amplitude of the far zone harmonic to provide the desired far field pattern.

It should also be noted that it is possible to have the transmitting antenna employed at the receiving end of the circuit, that is, a signal will be transmitted from a plurality of antennas having their positions periodically changed in accordance with the cosine function and the corresponding location of the transmitting antenna be arranged with a single receiving antenna. This arrangement has the advantage that the recording equipment is all at the main site. In addition, the use of C.W., continuous wave radiation, is preferred since when a pulse system is employed it includes the further requirement that the transmitting signal by synchronized with the switching of the probes.

In another embodiment of the invention the time modulation characteristic may be advantageously employed in combination with Doppler techniques to produce the Fraunhofer pattern. As distinguished from the above arrangement, however, the Doppler techniques do not produce a real time computation in a fashion to allow the Fraunhofer pattern to be directly obtained from the apparatus but requires that the pattern that is obtained be passed through a Fourier integral computer to obtain the far field pattern.

For large antennas, measurement of the Fraunhofer pattern within the Fresnel region may be accomplished by subdividing the antenna into a number of elements such that the measurement is in the far zone of each element. Therefore, the antenna aperture can be divided into N parts, each of which is measured separately at a distance R such that $$R \geq \frac{2}{\lambda}\left(\frac{L}{N}\right)^2 = \frac{R_o}{N^2} \qquad (13)$$

therefore, if $N=10$, $R \cong 0.1\ R_o$, resulting in a significant reduction in range. This subdivision of an antenna aperture into a number of elemental compartments may be achieved in the Doppler pattern range because of the angle characteristics of the effective Doppler shifts which are produced. This effective Doppler shift may be produced by a travelling probe which moves in a direction transverse to the antenna axis or longitudinal width or by a vibrating probe.

In the transverse Doppler arrangement used with very large antennas the modulated receiving antenna array 13 may comprise the above described antenna structure for sequentially switching between each array to produce the effective probe motion or it may comprise a single receiving probe that is moved physically across the aperture extent in a single pass. This receiving probe movement may be accomplished by means of rockets or aircraft. Assuming that the receiving probe is carried by an aircraft in a direction transverse to the antenna aperture, it will be noted that the zero Doppler shift will be produced at a point that is transverse to the antenna aperture and that at all other points a Doppler shift will be detected. It is therefore necessary in order to detect the zero Doppler frequency that a frequency analyzer or filter be employed tuned to this frequency. A system of this type is shown in FIG. 8. With the sequential sampling of the antenna aperture in this fashion, the entire antenna is converted from a spatial function to a time function as the probe traverses it at a constant velocity. The frequency analyzing is then accomplished by the filter and the output of the filter is applied to a storage device. At the completion of a single pass across the complete antenna aperture the information stored in the storage device is read out and applied to a display device. However, in this instance the pattern displayed is not the Fraunhofer pattern of the aperture and, therefore, it requires further processing by means of a Fourier integral computer to transform this pattern into the Fraunhofer pattern of the aperture.

The measuring technique discussed hereinabove may be employed with a longitudinally moving receiving probe to produce similar Doppler characteristics. The structural organization of the receiving circuitry is, however, modified due to the different geometric orientation of the antenna and the receiving probe. With the use of the longitudinal motion of the probe the Doppler spread corresponding to the aperture extent is considerably smaller than in the case of the transverse Doppler and therefore requires much narrower filter bandwidths to sample the aperture extent effectively.

The vibrating probe type of Doppler arrangement is characterized by the fact that it does not travel the entire length of the antenna aperture. In this instance a constant Doppler frequency cannot be detected due to the large difference in length between the probe travel and the aperture size. With the vibrating probe type of arrangement, the zero Doppler frequency is not detected and the probe merely traverses the points spaced on opposite sides of the zero Doppler area, or broad side, to produce the Doppler shifts for the various probe positions and through a frequency selection or multiple filtering arrangement the various frequencies are detected in accordance with the particular location of the probe. The output signals from the multiple filters are then integrated by the sampling integrator to obtain a pattern similar to the pattern for the non-vibrating type of Doppler. A typical arrangement is shown in FIG. 9. Again, this displayed pattern must be passed through a Fourier integral computer to obtain the desired Fraunhofer pattern. It should be noted that in all of these arrangements the transmitting antenna can either be rotated and the pattern characteristics determined or it can remain stationary. In addition, the vibrating probe technique can be vibrated when the probe is either traveling transverse or longitudinal to the radiation and processed by the multiple filters.

What is claimed is:

1. A method for measuring the Fraunhofer pattern of an antenna in other than the Fraunhofer zone comprising radiating electromagnetic energy from a source, receiving the radiated energy at a preselected range outside of the Fraunhofer zone in a periodic time modulated fashion, and electronically processing the thus modulated signal to derive the Fraunhofer pattern of the antenna.

2. A method for measuring the Fraunhofer pattern of an antenna in other than the Fraunhofer zone comprising radiating electromagnetic energy from a source, receiving the radiated energy at a preselected range outside of the Fraunhofer zone in a periodic time modulated fashion and modifying the time modulated patterns to cause the radiated energy to assume a plurality of unique information portions including one characteristic of the Fraunhofer pattern, and separating out the signal portion characteristic of the Fraunhofer pattern.

3. A method for measuring the Fraunhofer pattern of an antenna within the Fresnel zone comprising radiating electromagnetic energy from a source in a preselected fashion, positioning at least a single receiving antenna at a preselected range from the source within the Fresnel zone of said source, controlling the receiving antenna to cause the received energy to have a periodic time modulated characteristic, and processing the received energy for separating out and displaying the portion thereof representative of the Fraunhofer pattern.

4. A method for measuring the Fraunhofer pattern of an antenna within the Fresnel zone comprising radiating electromagnetic energy from a source in a preselected fashion, positioning at least a single periodic time modulated receiving antenna at a preselected range from the source within the Fresnel zone of said source, frequency analyzing the received energy for detecting the frequency component representative of the Fraunhofer characteristic of the source, and displaying the Fraunhofer pattern.

5. A method for determining the far field characteristic of a transmitting antenna at a distance which is a fraction of the actual far field distance thereof including the steps of radiating a signal from a transmitting antenna to be measured, receiving the transmitted signal at a plurality of separate locations in a preselected time sequence, the received signal of the antenna being represented by an expansion containing a plurality of terms including a term representative of the far field characteristic, modifying the received signal at each receiving location to cause the portion of the signal representative of the far field characteristic to be readily separable, generating an intermediate frequency signal from the thus modified received signal while retaining the signal characteristic of the far field, and detecting only the signal portion characteristic of the far field.

6. A method for determining the far field characteristic of a transmitting antenna at a distance which is a fraction of the actual far field distance thereof including the steps of radiating electromagnetic energy from a transmitting antenna to be measured, positioning a plurality of receiving antennas at a preselected range from the transmitting antenna and spaced apart in accordance with a trigonometric function, separately coupling the energy from each of the receiving antennas in a preselected time relationship to provide a periodic time modulation of the range, modifying the received energy at each receiving location to cause the portion of the energy representative of the far field characteristic to be readily separable, generating an intermediate frequency signal from the thus modified received energy while retaining the energy characteristic of the far field, and filtering out the portion characteristic of the far field.

7. A method for determining the far field characteristic of a transmitting antenna at a distance which is a fraction of the actual far field distance thereof as defined in claim 6 wherein the receiving antennas are arranged in acccordance with the sine or cosine function.

8. A method for determining the far field characteristic of an antenna at a distance which is a fraction of the actual far field distance including the steps of transmitting a signal from the antenna to be measured, receiving the signal from the antenna at a distance which is outside the far zone of the antenna, periodically varying the distance of the receiving antenna at preselected intervals, multiplying the received signals by a voltage which is synchronously related to the time variations of the distances of the receiving antenna to allow the received radiation to assume a plurality of information channels including a far field characteristic channel to be separable from the other information channels, and filtering the resulting signal to obtain the signal which is representative of the far field characteristic.

9. A method for measuring the Fraunhofer pattern of an antenna in other than the Fraunhofer zone comprising radiating electromagnetic energy from a source, receiving the radiated energy at a plurality of locations outside the Fraunhofer zone of the antenna proper and within the Doppler pattern range, periodically time modulating the received radiated energy at each of the locations, and filtering out the desired frequency components for determination of the radiation pattern.

10. A method as defined in claim 9 including the steps of processing the resulting radiated energy pattern with a Fourier integral computer to provide the Fraunhofer pattern.

11. A method as defined in claim 9 wherein the radiated energy is received in a plane transverse to the radiation.

12. A method as defined in claim 9 wherein the radiated energy is received in a plane extending longitudinally with the radiation.

13. A method as defined in claim 11 wherein the radiated energy is received at a plurality of locations extending over a distance less than the entire length of the antenna aperture and wherein the receiver probe is vibrated over a preselected distance at each location, each receiving location being outside the zero Doppler range.

14. Apparatus for determining the far zone characteristic of an antenna by measurements outside the far zone comprising a plurality of aligned receiving antennas arranged over a range interval and spaced apart preselected distances from a transmitting antenna to be measured, each of said receiving antennas including separate controllable switching means coupled thereto for transmitting a received signal therethrough when placed in a signal transmitting mode and normally arranged in a non-transmitting mode, circuit means coupled to each of said switching means for separately and sequentially placing each of said switching means in a signal transmitting mode for a preselected interval to produce a periodic time modulation of the received radiation, receiving means coupled to each of said receiving antennae to receive the signal transmitted therethrough, said receiving means including means for producing an intermediate frequency signal, means for providing a signal synchronously related to the periodic time modulation of the radiation, means for mixing the intermediate frequency signal and the latter mentioned signal to cause the signal portion representative of the far field characteristic to be readily separable, and filtering means connected to be responsive to the signal from the mixing means including the far field characteristic.

15. Apparatus of the type of claim 14 wherein the receiving antennas are spaced apart in accordance with a preselected trigonometric function over the range and the transmitting intervals of each of the antennas are controlled to be substantially equal to provide the periodic time modulation of the received radiation.

16. Apparatus of the type of claim 14 wherein the receiving antennas are spaced apart substantially equal distances and the transmitting intervals of each of the antennas are defined to occur in unequal increments of time to provide the periodic time modulation of the received radiation.

17. Apparatus for determining the far zone characteristic of an antenna by measurements in other than in the far zone comprising a plurality of aligned receiving antennas arranged over a range interval and spaced apart preselected distances from a transmitting antenna to be measured, each of said receiving antennas including separate controllable switching means coupled thereto for transmitting a received signal therethrough when placed in a signal transmitting mode and normally arranged in a non-transmitting mode, circuit means coupled to each of said switching means for separately and sequentially placing each of said switching means in a signal transmitting mode for a preselected interval to produce a periodic time modulation of the received radiation, each of said receiving antennas further including a series connected attenuator and phase shifter calibrated to cause the time modulated radiation to be modified whereby the signal portion characteristic of the far zone may be separated, receiving means coupled to each of said receiving antenna to receive the signal transmitted therethrough, said receiving means including means for producing an intermediate frequency signal, and filtering means connected to be responsive to the signal portion from the mixing means including the far field characteristic.

18. Apparatus as defined in claim 17 including a detector coupled to said filter to detect and separate out the far field characteristic only, and display means coupled to said detector for recording and displaying the far zone pattern.

19. Apparatus for determining the far zone characteristic of a transmitting antenna within the Fresnel region comprising a plurality of receiving antennas spaced apart in accordance with a preselected trigonometric distribution over the range interval, individual switching means coupled to each receiving antenna to selectively control the respective antenna, switch programming means coupled to each of said switching means to control the switching time increments of each antenna with reference to the spacing between the adjacent antennas to produce a periodic time modulation of received radiation, each of said antennas including a series arrangement of a calibrated attenuator and phase shifter coupled intermediate the antenna and the switching means to cause the signal components of the received radiation to each assume a unique signal characteristic and including a signal portion having the far zone characteristic, a receiver including a frequency mixing means coupled by a corporate feed with each of said switching means to receive signals from the receiving antennas during the switching time increments of each antenna, a local oscillator coupled to said mixing means in combination with the received signal to produce an intermediate frequency signal, filtering means defined to be responsive to the signal component representative of the far zone characteristic, and means coupled to said filtering means for recording the signal characteristic of the far zone.

20. Apparatus for determining the far zone characteristic of a transmitting antenna within the Fresnel region comprising calibrating apparatus including an amplitude bridge characterized as operating on the amplitude of a pair of signals to be compared and not their phase relationship to provide a measure of their relative amplitudes, a phase bridge coupled in parallel circuit relationship with said amplitude bridge and operable on signals of equal amplitude to determine their phase relationships, means for coupling one of the signals to be measured to one terminal of each of said bridges, means for coupling the other signal to be measured to the other terminals of each of said bridges, an amplitude adjusting means coupled in series circuit arrangement with one of the terminals for the phase bridge to allow the amplitude of the corresponding signal to be adjusted.

References Cited in the file of this patent

Bickmore: "Fraunhofer Pattern Measurement in the Fresnel Region," published in the Canadian Journal of Physics, vol. 35, 1957, pp. 1299–1308.